Figure 1:
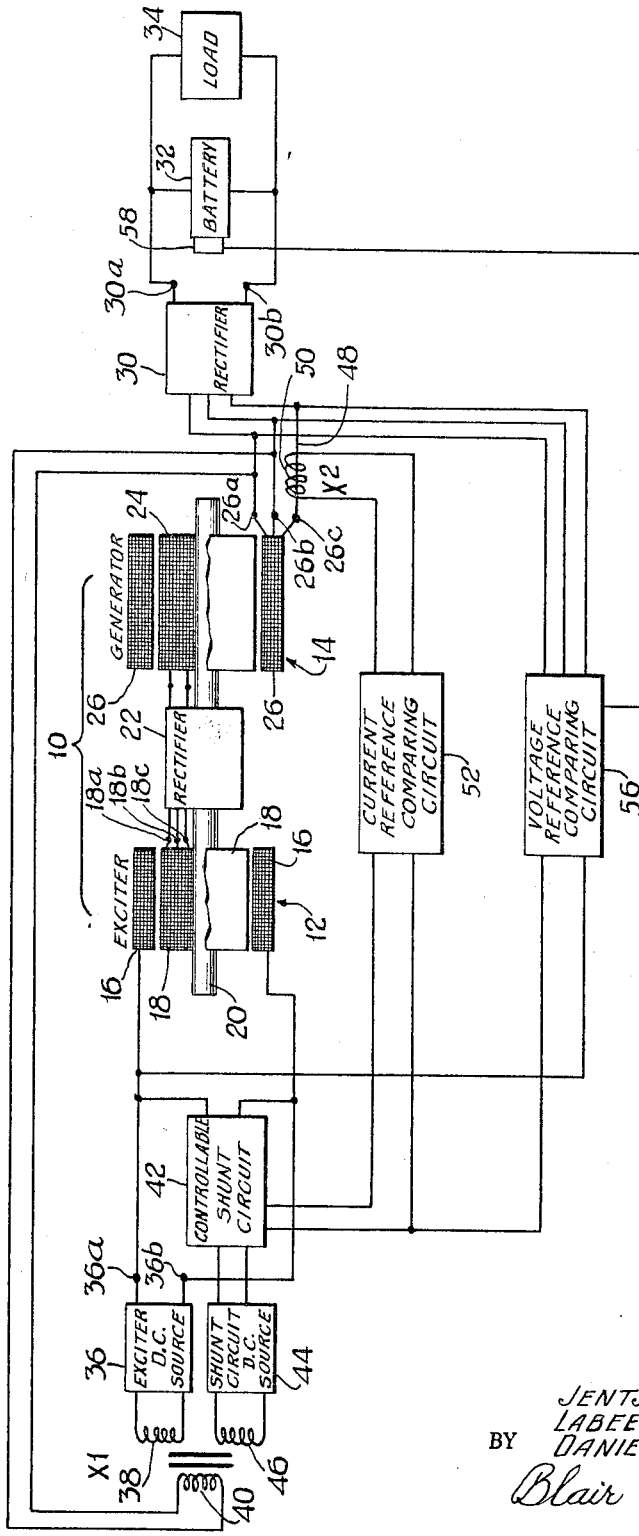

INVENTORS
JENTJE J. ROOSMA
LABEEB B. HADDAD
DANIEL P. SCHMITT
BY Blair & Buckles
ATTORNEYS INVENTORS
JENTJE J. ROOSMA
LABEEB B. HADDAD
DANIEL P. SCHMITT
BY
Blair & Buckles
ATTORNEYS

United States Patent Office 3,290,582
Patented Dec. 6, 1966

3,290,582
BRUSHLESS GENERATING SYSTEM REGULATOR WHICH SHUNTS EXCITATION CURRENT FROM THE FIELD WINDING
Jentje J. Roosma and Labeeb B. Haddad, Hamden, and Daniel P. Schmitt, Northford, Conn., assignors to Safety Electrical Equipment Corp., New Haven, Conn.
Filed Nov. 9, 1962, Ser. No. 236,518
13 Claims. (Cl. 322—25)

This invention relates to electric power generating equipment and to a regulator system for use therewith. More specifically, the invention provides novel and improved circuits to regulate the output voltage and current from a generator when subjected to a plurality of widely varying operating conditions.

The invention is particularly suited for regulating the power generated in mobile equipment, such as a railroad car. In one embodiment of the invention, portions of the output voltage and output current from a generator having an exciter are compared with reference values to develop regulating signals responsive to the amount by which the output voltage and output current exceed the reference values. These regulating signals adjust the average shunt impedance that an electronic circuit applies in parallel with the exciter input to regulate the generator output current and output voltage.

According to one conventional installation for a railroad car generator, the generator armature winding is rotated by rotation of the railroad car wheels. Consequently, the amplitude of the generated voltage, increasing with the speed of armature rotation, varies widely as the train starts from a station, accelerates to its top speeds and slows down for grade crossings and the like.

Current regulation is required to prevent the electrical load, comprising lighting equipment, air conditioning equipment, and signaling and control equipment, from drawing excessive current from the generator. Further, voltage regulation is required to protect the load from excessive voltage, generated at high speeds.

To provide a standby electrical source, the generating system charges a storage battery. However, to prevent the battery from overheating during charging, and to prevent excessive voltage from being applied to the battery, additional regulation of the generator system is desired.

Until recently, railroad car electric generating equipment utilized a carbon pile type voltage regulator to control the generator output voltage. This bulky regulator incorporated a slow-operating mechanical linkage and provided voltage regulation only to within about 3% of the desired value. In addition, the generator required brushes to communicate with the rotating windings. A further disadvantage was that the regulator mechanical linkage and the generator brushes required frequent maintenance.

In many prior regulated generating systems, a reverse current relay or similar mechanical control is required to disconnect the generator from the battery, providing standby power when the train is stationary, and from the load when the generator voltage is below the battery voltage. The reverse current control thus prevents the battery from discharging through the generator system.

Also, prior generator systems having a direct current generator require mechanical polarity reversing apparatus to change the polarity of the generated voltage when the railroad car is moved backwards.

These mechanical, reverse current and polarity controls increase the complexity, cost and maintenance requirements of prior art regulated generating systems.

More recently, efforts have been made to develop electronic regulators and brushless generators for railroad and similar generating systems.

In the present invention, it is a principal object to provide an improved electric generating system. More particularly, it is an object to provide an improved vehicle electrical generating system that is powered at a rate corresponding to the rate of vehicle movement.

Another object of the invention is to provide an improved brushless generating system.

Yet another object is to provide an improved generator regulator. More specifically, it is an object to provide a regulator for a generator system having an exciter.

Another object of the invention is to provide a regulator of the above character that requires minimum power to deliver maximum excitation to the generator.

A more specific object is to provide a regulator of the above description that regulates both the generator output current and the generator output voltage.

Still another object is to provide a regulator of the above description that controls a battery-charging generator to prevent overheating of the storage battery due to charging at an excessive rate.

A further object is to provide an efficient regulated railroad car electric generating system that provides stable regulation over a plurality of widely varying operating conditions.

The invention has as another object the provision of a vehicular generator system producing a direct current voltage without requiring polarity reversing mechanisms.

It is a further object to provide a battery charging generator system that does not require mechanical reverse current control.

Yet another object is to provide an efficient regulated generating system that requires minimum maintenance.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Figure 2:
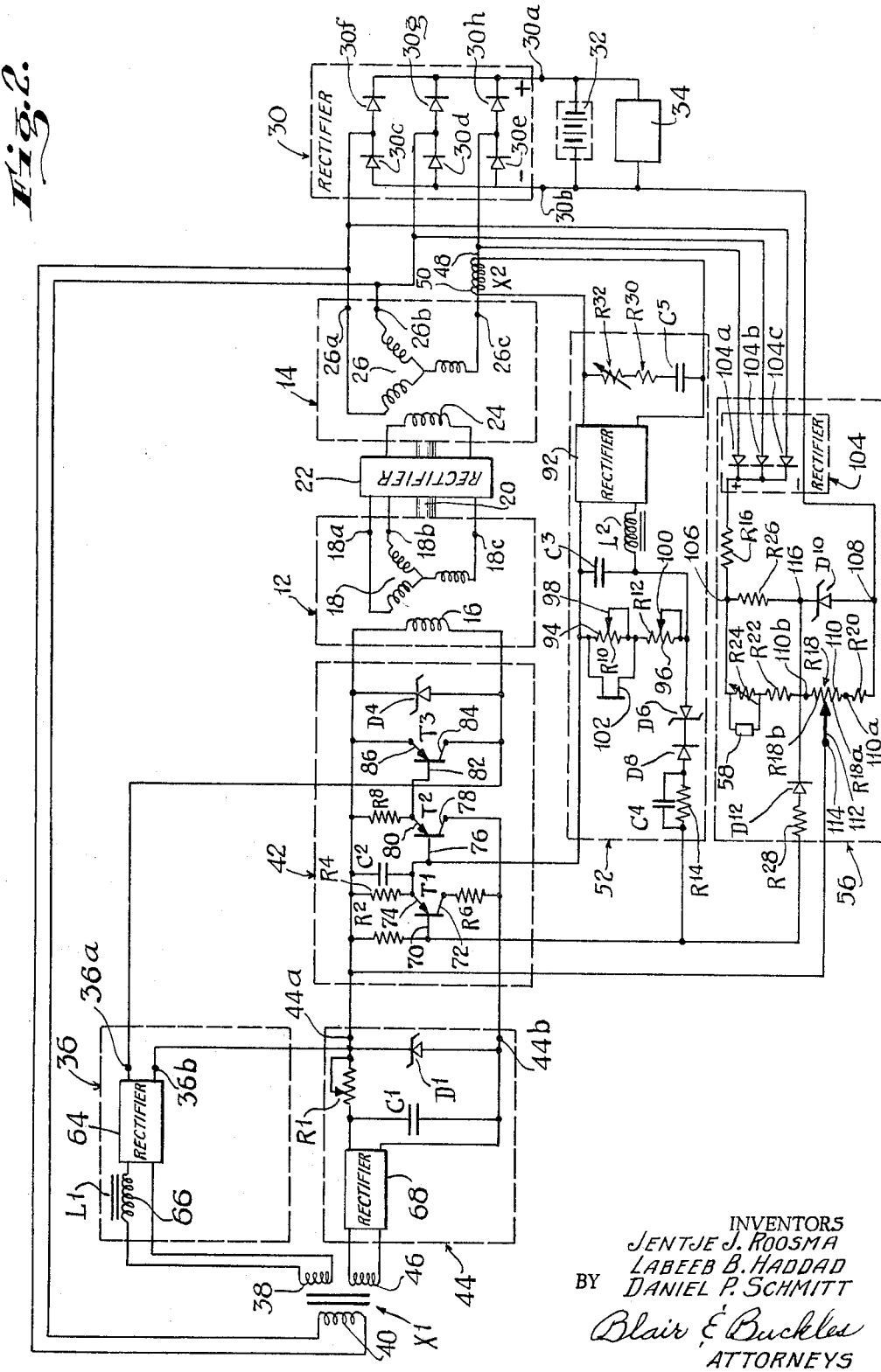

For a fuller understanding of the nature and objects of the invention, reference should be had to the following detailed description taken in connection with the accompanying drawings, in which:

FIGURE 1 is a block schematic diagram of a regulated electric generating system embodying the present invention; and FIGURE 2 is a detailed schematic diagram of the regulated generating system of FIGURE 1.

In an embodiment of the invention for regulating the output from a railroad car generator having an exciter, the output current and voltage from the generator are utilized to vary the average voltage applied to the exciter by varying the time during which a low impedance is switched to shunt the exciter input.

When the low impedance is switched OFF, so as not to shunt the exciter input, the exciter is energized to cause to shunt the exciter input, the exciter is energized to versely when the low impedance is switched ON, shunting the exciter input, the exciter receives little energizing voltage, and, accordingly, causes the generator output voltage to be small.

During normal operation, the novel regulator continually switches the low impedance OFF and ON across the exciter input. The time during which the impedance is switched ON is varied to control the exciter to maintain the generator output voltage at a selected level.

More specifically, referring to FIGURE 1, generator system 10 is constructed with an exciter indicated generally at 12 and an alternating current generator indicated generally at 14. Exciter 12 has a stationary field winding 16 disposed around a rotatable armature winding 18 mounted on a shaft 20 for rotation therewith. Shaft 20 may, for example, be coupled through a clutch (not shown) to the wheels of a railroad car. With this arrangement, the rate of shaft rotation is proportional to the speed of the car. Rotation of the shaft 20 rotates the exciter armature winding 18 to cut the magnetic flux developed by the exciter field winding 16 so that an exciter voltage is generated between the armature terminals 18a, 18b and 18c.

A rectifier 22, preferably full-wave, is connected with the armature terminals to receive the alternating exciter voltage. The rectifier applies a full-wave rectified exciter voltage between the input terminals of a generator field winding 24 mounted on the shaft 20. Rectifier 22 also is mounted for rotation with the shaft 20 so that fixed connections are maintained between the exciter armature winding 18, the rectifier 22 and the generator field winding 24. No slip rings, brushes, or other sliding contact devices are required.

The rectified voltage applied to the generator field winding 24 produces a field of magnetic flux that rotates with the shaft-carried field winding 24, this rotating flux cuts the windings of a stationary generator armature winding 26 disposed around the field winding 24 to develop an alternating voltage, hereafter referred to as the generator output voltage, between the generator armature terminals 26a, 26b and 26c.

Still referring to FIGURE 1, the generator output voltage is applied to a full-wave rectifier 30, preferably constructed with a conventional bridge circuit, to develop a direct current voltage between the rectifier terminals 30a and 30b. This D.C. voltage is then applied to a storage battery 32 and an electrical load indicated at 34.

The present combination of an alternating current generator and a rectifier, instead of the direct current generator common in the prior art, obviates the prior art requirements for separate reverse current controls and for a generator polarity reversing device. The polarity of the rectifier 30 direct current output voltage is the same when the shaft 20 is rotated clockwise and counterclockwise. Similarly, the rectifier 30 prevents the battery 32 from discharging through the generator armature winding 26.

As the shaft 20 rotates faster, with increasing train speed, the output voltage from the generator 14 tends to increase. A controllable shunt circuit, indicated generally at 42, regulates the generator by limiting its output voltage to protect the battery 32 and load 34 from excessive voltages. The circuit 42, which will be described in greater detail hereinafter, operates, in effect, as a switch shunting the exciter field winding 16. For example, when the shunt circuit is switched ON, shunting the exciter field winding for longer periods of time during each switching cycle, the exciter delivers less voltage to the generator which, in turn, produces a smaller output voltage.

The shunt circuit 42 is controlled primarily by a voltage reference comparing circuit indicated generally at 56 that delivers to the shunt circuit 42 a pulsating voltage regulating signal in which the pulse duration corresponds to the amplitude of the alternating generator output voltage. In response to this regulating signal the shunt circuit varies the time in each switching cycle during which it switches the low impedance in parallel with the exciter field winding, to substantially diminish the voltage received by the exciter. As will also be described more fully below, a thermistor 58 senses the temperature of battery 32 and is connected with the voltage reference circuit 56 to cause the voltage regulating signal to regulate the generator output voltage so that the battery 32 is not overheated by excessive charging.

As also shown in FIGURE 1, a transformer X2, whose primary winding is the conductor 48 connecting the generator armature terminal 26c with the rectifier 30, has a secondary winding 50 which delivers an alternating sensed voltage to a current reference comparing circuit indicated generally at 52. The circuit 52 compares the sensed voltage developed by transformer X2, which is proportional to the current drawn from the generator armature winding 26, with a reference voltage furnished by a Zener diode.

When the sensed voltage exceeds the reference voltage, the current comparing circuit 52 applies a current regulating signal to the controllable shunt circuit 42. The shunt circuit responds by shunting the exciter field winding for a larger portion of each shunt circuit switching cycle. This in turn reduces the average D.C. voltage applied to the exciter field winding 16 to reduce the output from the generator 14.

Still referring to FIGURE 1, to energize exciter 12 when the railroad car is moving, an exciter D.C. source 36 applies a direct current voltage between terminals 36a and 36b, connected to the exciter field winding 16. The source 36 is energized with the alternating voltage developed across a secondary winding 38 of a transformer X1 whose primary winding 40 is connected between the generator armature terminals 26a and 26b to receive alternating voltage from the generator 14.

Transformer X1 has also another secondary winding 46 connected to a D.C. source 44 that rectifies and filters the alternating voltage developed across the winding 46 to apply a direct current voltage to operate the controllable shunt circuit 42.

In general, when the generator output voltage is less than the battery voltage, as when the train is stationary or moving at very low speeds, the load 34 is operated from the battery 32. The battery voltage reverse biases the rectifier 30 so that no current is delivered by the generator winding 26 to the rectifier 30, battery 32 and load 34. The small current drawn from the generator 14 by the regulating system is insufficient to cause the current comparing circuit 52 to produce a current regulating signal, except in the event of a short circuit or similar malfunction. Similarly, the small generator output voltage does not produce a voltage regulating signal.

When the generator voltage exceeds the battery voltage, the generator 14 delivers current to the battery and load and voltage regulation is now utilized to prevent the generator voltage from exceeding the maximum battery voltage and from damaging the load. The current regulation is now responsive to the current through the rectifier 30 as well as the current delivered to the regulating system.

Turning now to FIGURE 2, the exciter D.C. source 36 incorporates a full-wave rectifier 64, preferably constructed as a conventional four-arm bridge circuit with semiconductor rectifiers, and an inductor 66 connected in series between the transformer X1 secondary winding 38 and the rectifier 64.

The frequency of the generated A.C. voltage from generator 14 varies with the speed of the railroad car, and, as is well known, the impedance of an inductor is proportional to the frequency of its current. The impedance of inductor 66 thus varies with the frequency of the generator output voltage it receives from transformer X1 winding 38. This regulates the alternating voltage received by rectifier 64, decreasing the voltage as the railroad car speed and, similarly, the generator output frequency increase.

The variation in the electric excitation thus delivered by the rectifier 64 to the winding 16, due to the inductor 66, corresponds approximately with the current required by the load 34 from the generator armature winding 26 as the railroad car speed varies. Thus the inductor 66 regulates the generator output power according to the varying speed of the railroad car.

As also shown in FIGURE 2, in the illustrated embodiment, exciter 12 is constructed with a single field winding 16 and with three windings connected in a Y configuration in the armature winding 18, to deliver a three-phase alternating exciter voltage to the full-wave rectifier 22. Similarly, the generator field winding 24 is constructed with a single winding and the generator armature winding 26 with three windings, again connected in a Y configuration, to generate a three-phase alternating generator output voltage that is delivered to the rectifier 30. The rectifiers 22 and 30 are preferably constructed as delta, six-phase, Y, double-way bridge rectifier circuits, which are explained on pages 314–316 of "Applied Electronics" by Gray (2d ed. 1954, Technology Press).

When the shaft 20 is stationary, as occurs when the railroad car is at a complete stop, the generator 14 has no output power and consequently the rectifier 64 cannot energize the exciter field winding 16. To avoid using a storage battery to energize the exciter under these conditions, the exciter field winding 16 is preferably wound on a core (not shown) of material having a high magnetic retentivity. With this preferred construction, a remnant magnetic field remains in the exciter field core after the applied exciter excitation ceases. Rotation of the exciter armature winding 18 cutting this remnant flux generates sufficient exciter output voltage to initiate operation of the generator 14.

Still referring to FIGURE 2, the shunt circuit D.C. source 44 may be constructed with a full-wave rectifier 68 that develops a D.C. voltage when energized with the alternating voltage developed in the transformer X1 secondary winding 46. A capacitor C1 filters the D.C. voltage and a series resistor R1 limits the current drawn from the rectifier 68. A Zener diode D1 is connected in parallel with the filtered D.C. voltage to limit the maximum value of the voltage applied to the shunt circuit 42 and to protect its transistors T1 and T2 from high transient voltages that may develop when they switch.

Referring now to the detailed schematic diagram of the controllable shunt circuit 42 of FIGURE 2, a transistor T1, having a base terminal 70, a collector terminal 72 and an emitter terminal 74, is arranged with a resistor R2 connected between the source terminal 44a and base terminal 70, with a resistor R4 connected between the emitter terminal 74 and the terminal 44a and a resistor R6 connected between the collector terminal 72 and the source terminal 44b. The resistor R6 limits the transistor collector current, and the resistors R2 and R4 provide a quiescent bias voltage between the emitter and base terminals 74 and 70, respectively, so that in the quiescent state the transistor T1 is substantially non-conducting, with substantially no collector current. A capacitor C2, in parallel with resistor R4, stabilizes the operation of the shunt circuit 42 and prevents it from oscillating.

When the voltage at the base terminal 70 is made more negative with respect to the voltage at the emitter terminal 74, the transistor T1 begins to conduct, increasing the current through resistor R4 which in turn decreases the voltage at the transistor T1 emitter terminal 74. The emitter terminal 74 is connected to a base terminal 76 of a transistor T2 whose collector terminal 78 is connected directly to the terminal 44b. A resistor R8 is connected between transistor T2 emitter terminal 80 and the terminal 44a. Under no-signal conditions, the transistor T2 is biased by resistors R4 and R8 to be non-conducting. When the transistor T1 is turned ON by a decreasing voltage applied to its base terminal 70, as discussed above, the decreasing voltage at its emitter terminal 74, applied to the base terminal 76, causes transistor T2 to conduct between its emitter and collector terminals 80 and 78. The resistor R1 in the source 44 limits the maximum collector current drawn by the transistor T2.

A transistor T3 has its emitter terminal 86 connected to exciter source terminal 36b, its collector terminal 84 connected to source terminal 36a, and its base terminal 82 connected with the transistor T2 emitter terminal 80. When sufficient exciter source voltage develops between terminals 36a and 36b, the decreasing voltage developed at the emitter terminal 80, by switching transistor T2 ON, switches transistor T3 ON, to the conducting condition, to shunt the exciter field winding 16 with the transistor's low emitter-collector resistance. Thus, when transistor T3 is ON, little voltage develops across the shunted field winding 16. Conversely, a large voltage develops across the winding 16 when the transistor T3 is OFF and its emitter-collector resistance is high.

The transistors T1, T2 and T3 resume their normally OFF condition by removing the negative voltage from the transistor T1 base terminal 70, allowing that terminal to assume its quiescent level. A Zener diode D4 is connected between the transistor T3 emitter and collector terminals to protect the transistor from high transient voltages developed when it switches.

At slow train speeds, maximum voltage is generally required by the load 34 from the generator 14. This requires the circuit 42 to have maximum shunt resistance, to apply maximum voltage to the exciter, and to draw minimum power from the generator 14 to present this high shunt resistance. The present regulating system, by applying regulation in parallel with the generator system 10, efficiently meets both these requirements. Specifically, the emitter-collector resistance of transistor T3 has a high, maximum, value when the transistor is non-conducting, which occurs when shunt circuit 42 draws the least power from the generator 14. Thus the present regulating system has maximum low speed efficiency, a substantial advantage over prior series-operated regulating systems, which consume maximum power when the load requires maximum power.

Continuing with reference to FIGURE 2, the voltage reference comparing circuit 56 incorporates a full-wave three phase rectifier, comprising the three rectifying elements of rectifier 104 in conjunction with three rectifying elements of rectifier 30 as detailed below, that receives the three-phase generator output voltage developed between the terminals 26a, 26b and 26c. Rectifier 104 applies an unfiltered, rippling, direct current output voltage through a series resistor R16 across a pair of bridge circuit terminals 106 and 108. The resistance R18 of a potentiometer 110, having a movable tap 112, is connected in series with resistors R20, R22 and R24 between the terminals 106 and 108, and the series combination of resistor R26 and a Zener diode D10 is also connected between the terminals 106 and 108. These connections provide a bridge circuit with the resistor R26 forming one bridge arm, the Zener diode D10 forming a second arm, and resistor R20 and resistance R18a, between the potentiometer tap 112 and its terminal 110a, forming a third arm. The fourth bridge arm is formed by the series combination of resistance R18b between tap 112 and potentiometer terminal 110b, and resistors R22 and R24. The voltage developed between the terminals 114 and 116 is applied through resistor R28 and a conventional diode D12 to apply a voltage regulating signal across the controllable shunt circuit resistor R2.

During operation, the rectifier 104, applies a conventional full-wave rectified three-phase voltage, having six peaks per cycle, between the bridge terminals 106 and 108 with positive voltage at terminal 106. This rectified voltage generally exceeds the diode D10 Zener voltage, causing the diode to conduct according to its Zener characteristics. Hence, the voltage across the diode D10, between terminals 116 and 108, is maintained at a constant reference value equal to the Zener voltage.

The difference between the Zener reference voltage and the rectified rippling voltage, termed a monitored voltage, developed between terminals 114 and 108 is tapped across terminals 114 and 116 and applied across the resistor R2 of shunt circuit 42. However, the diode D12 of circuit 56 is biased to be non-conducting when terminal 116 is more positive than terminal 114, and it thus prevents the voltage between these terminals from being applied to the transistor T1. Thus the diode D12 prevents the transistor T1 from being biased OFF with a large voltage from the voltage comparison circuit 56. One purpose of this is to allow the current reference circuit 52 to control the shunt circuit 42 when the voltage at voltage reference circuit 56 terminal 116 is positive with respect to the voltage at terminal 114. Without the diode D12, this positive voltage from circuit 56 might render the transistor T1 insensitive to current regulating signals.

When the instantaneous value of the monitored voltage exceeds the diode D10 Zener voltage, diode D12 is forward biased to apply across resistor R2 a voltage regulating signal, equal to the amount the monitored voltage exceeds the Zener reference voltage. The regulating signal biases the transistor T1 ON, switching transistor T3 ON to present a low resistance shunt across the exciter to substantially diminish the excitation received by the field winding 16. This in turn brings about a reduction in the generator output voltage, as explained hereinabove.

Still considering the voltage reference comparing circuit 56 shown in FIGURE 2, the voltage between the terminals 106 and 108 at which the monitored voltage exceeds the Zener reference voltage, which determines the amplitude to which the generator output voltage will be regulated by the circuit 56, is selected by adjusting the tap 112 on the potentiometer 110. Specifically, when the tap is moved toward the potentiometer terminal 110a, decreasing the resistance R18a and increasing resistance R18b, a larger generator output voltage is required to cause the monitored voltage to exceed the Zener reference voltage.

The potentiometer 110 tap 112 is preferably adjusted so that with the desired generator output voltage the peaks of the rippling monitored voltage exceed the Zener reference voltage, and the "valleys" between the peaks do not exceed the reference voltage. This adjustment causes the voltage reference circuit 56 to deliver a voltage reference signal comprising six pulses per cycle across the resistor R2 in the shunt circuit 42, each cycle coinciding with one quarter revolution of shaft 20 for a field winding 24 having four pairs of poles.

Shunt circuit 42 transistors T1 and T2, energized by the source 44, are switched ON by the initiation of each voltage reference pulse from the voltage reference circuit 56 and switch OFF at the end of each pulse. Thus, the transistors switch ON and OFF six times a cycle. In the illustrated embodiment, voltage from source 36 energizing the exciter field winding is ideally a full-wave rectified single phase voltage, varying sinusoidally from zero to a maximum value twice per cycle. Thus, the exciter field supply voltage drops essentially to zero during two pulses in each cycle of the voltage regulating signal and has a substantial magnitude during the remaining four pulses.

When the generator output voltage, developed at terminals 26a, 26b and 26c decreases, the monitored voltage exceeds the reference voltage of Zener diode D10 for a shorter time during each pulse of the six-peak rippling voltage from rectifier 104. This causes the duration of the voltage reference signal pulses to decrease with the result that transistor T1 switches ON for a shorter interval than when the reference signal pulses are longer. Transistor T3 is similarly driven ON for short periods, allowing the exciter field winding 16 to receive maximum voltage from source 36 for a larger portion of each cycle. As a result, the winding 16 produces a stronger magnetic flux so that a larger exciter voltage is delivered to the generator 14 to produce a larger output voltage. In this manner, the generator 14 is regulated to prevent its output voltage from dropping below a selected level as the load resistance and/or train speed vary.

Conversely, when the generator output voltage exceeds its desired level, the peaks of the rippling monitored voltage exceed the diode D10 Zener level for a longer duration to cause voltage reference circuit 56 to develop pulses having a longer duration than with normal generator output. These long pulses drive transistor T3, via transistors T1 and T2, to shunt the field winding 16 for relatively long recurrent intervals, to reduce the average voltage delivered to the field winding and cause the exciter to deliver less voltage to the generator, which in turn diminishes its output voltage to maintain the selected level.

The thermistor 58 is mounted on the battery 32 so that the thermistor temperature, and similarly its resistance, varies with the temperature of the battery. As shown in FIGURE 2, the thermistor is connected in parallel with the resistor R24 in the circuit 56. When the battery 32 temperature increases, the resistance of the thermistor 58 decreases, causing a larger portion of the voltage between the terminals 106 and 108 to be applied between terminals 114 and 108. Hence, the monitored voltage exceeds diode D10 Zener voltage for a longer time during each ripple peak of the rippling voltage from rectifier 104, with the result that transistor T3 is driven to shunt the exciter input for longer intervals. In this manner the thermistor 58 in circuit 56 controls the rate at which the battery 32 is being charged. The sensitivity of the voltage reference comparing circuit 56 to the fluctuations in the thermistor resistance can be adjusted by changing the value of the resistor R24.

As also shown in the circuit 56 of FIGURE 2, voltage dropping resistor R16, connected in series between the rectifier 104 and the terminal 106, matches the bridge circuit between terminals 106 and 108 with the rectifier 104, to permit the use of existing thermistors with the present regulator.

In addition, the bridge circuit can readily regulate the generator 14 to maintain different D.C. output voltages merely by changing the value of the resistor R16. Thus, with different resistances for resistor R16, the circuit 56 can be used, for example, in either a 40 volt generating system or an 80 volt system.

Still considering the voltage regulation of the generator 14 of FIGURE 2, when the voltage reference circuit 56 is energized not with alternating voltage as in the illustrated system but rather with the rectified generator voltage that appears across the battery 32, more accurate regulation is achieved. However, serious disadvantages are encountered because the regulation responds to the battery voltage rather than the alternating generator output voltage, as in the present system.

A further factor is that a substantial voltage drop develops across the rectifier 30 and that this voltage drop varies markedly with the load current. Hence, even when the generator alternating voltage between terminals 26a, 26b and 26c is regulated to remain constant, the rectified voltage applied to the battery 32 and load 34 varies as fluctuations in the load and battery current change the voltage drop across the rectifier 30.

These problems are solved according to the persent invention by constructing the rectifier 104 with three rectifying elements 104a, 104b and 104c plus three rectifying elements 30c, 30d and 30e from the rectifier 30 to constitute a complete bridge rectifier equivalent to the rectifiers 22 and 30. Specifically, the elements 104a, 104b and 104c are connected between the respective generator terminals 26a, 26b and 26c and the resistor R16, with their anodes connected with the generator terminals, as shown in FIGURE 2 these elements rectify the positive component of the generator output voltage. The elements 30c, 30d, and 30e each having its cathode connected with a generator terminal, are respectively connected between the terminals 26a, 26b and 26c and the bridge terminal 108 as well as the rectifier 30 terminal 30b. Thus connected, these elements rectify the negative component of the generator voltage. The rectifying elements 30c, 30d and 30e utilized in rectifier 104, carry half the load and battery current, and the elements 30f, 30g and 30h carry the other half of the load and battery current. Hence, the voltage applied across the bridge terminals 106 and 108 by rectifier 104, to develope the voltage regulating signal, is responsive to half of the voltage drop across rectifier 30 due to the load and battery current.

As a result the generator is regulated to compensate for this voltage drop, enhancing the accuracy of the regulation.

Moreover, the rectifying elements 30f, 30g and 30h isolate the voltage reference circuit 56 from the battery 32 voltage, avoiding the disadvantages mentioned above.

Still referring to FIGURE 2, the current reference comparing circuit 52 is preferably constructed with a full-wave bridge rectifier 92 connected with the transformer X2 secondary winding 50 to rectify the sensed alternating voltage it develops. A series inductor L2 and a shunt capacitor C3 filter the rectified sensed voltage, reducing ripple voltage, and apply it across the series combination of rheostats 94 and 96 having movable taps 98 and 100 respectively. A normally-closed switch indicated at 102 is connected in parallel with the rheostat 94.

The voltage developed across the rheostats 94 and 96 is applied through series-connected Zener diode D6, conventional diode D8 and resistor R14 between the transistor T1 base terminal 70 and its emitter terminal 74. The resistor R14 limits the current Zener diode D6, and diode D8 isolates the current reference comparing circuit from drawing reverse currents from the other regulating units. Capacitor C4, in parallel with resistor R14, stabilizes the regulating operation of the circuit 52, preventing it from regulating the generator 14 so that its output current continuously swings above and below the selected maximum level, a condition referred to as "hunting."

When the switch 102 is closed, the voltage across the rheostat 96 resistance R12, between rheostat 96 tap 100 and rheostat 94, is in proportion to the current through the transformer X2 primary winding 48 and to the value of resistance R12. This rheostat 96 voltage having a ripple component, is applied through the transistor T1 emitter-base junction to back bias the Zener diode D6, preventing the transistor T1 from drawing current from the circuit 52 until the rheostat 96 voltage exceeds the diode D6 Zener voltage. Hence, when the transformer X2 primary winding 48 current is small, the voltage across the rheostat 96 resistance R12 is less than the diode D6 Zener voltage, and the circuit 52 does not deliver a current regulating signal to the shunt circuit 42.

However, when the generator output current through the transformer X2 primary winding 48 increases, as caused by a decrease in the impedance of the load 34, the peaks of the rippling voltage across the resistance R12 attain the diode D6 Zener voltage. The diode then recurrently conducts according to its Zener characteristics and delivers a pulsating regulationg signal to the controllable shunt circuit 42. As described below, this signal effects a decrease in the generator output voltage until the generator output current drops below its selected maximum value. Generally, the peaks of the monitored voltage of the circuit 56 also drops to below the diode D6 Zener voltage, so that no voltage regulating signal is developed when the current regulating signal is present.

The current regulating signal, proportional to the amount by which the generator current in transformer X2 exceeds its selected maximum value, drives the transistor T1 base terminal 70 negative with respect to its emitter terminal 74, as do the pulses of the voltage regulating signal, to switch transistor T1 ON for the duration of each regulating signal pulse. In this manner, the pulsating current regulating signal recurrently switches transistor T3 ON, shunting the exciter winding 16 with a low resistance, to decrease the average excitation received by the exciter from source 36.

The resultant decrease in the average exciter excitation reduces the magnetic flux developed by the exciter field winding 16 reducing the alternating exciter voltage delivered by the winding 18 to the rectifier 22, and thence to the generator field winding 24. As a result, the generator output voltage decreases until the voltage across the resistance R12, in circuit 52, drops to below the diode D6 Zener voltage.

Still referring to the current reference comparing circuit 52 shown in FIGURE 2, the tap 100 of rheostat 96 is adjustable to change the value of the generator output current through the transformer X2 primary winding 48 at which the Zener diode D6 conducts on its Zener characteristics. More specifically, when the resistance R12 is decreased, a larger current through the primary winding 48 is required to raise the voltage across the resistance R12 to the diode D6 Zener voltage.

To operate the generator system 10 when the railroad car is at a station for prolonged periods, it is a conventional practice to de-clutch the shaft 20 from the railroad car wheels and to rotate it with an electric motor (not shown). Generally, this standby power is less than the power normally provided when the train is operating. To provide current regulation in the manner described above when operating on the standby conditions, the switch 102 is opened, applying the resistance R10 of rheostat 94 in series with the resistance R12 of rheostat 96.

Compared to the primary winding current required when switch 102 is closed, a substantially smaller generator output current in the transformer X2 primary winding 48 now develops across the higher resistance, provided by this combination of rheostats 94 and 96, a voltage that equals the diode D6 Zener voltage. Thus, by opening the switch 102, the circuit 52 automatically controls the shunt circuit 42 to regulate the generator output current at a lower value than when the switch 102 is closed.

It has also been found that due to the increase in inductive reactance of transformer X2 winding 50 with train speed (i.e. with rotation speed of shaft 20), the voltage across rheostat resistance R12 attains the diode D6 Zener value at progressively smaller values of generator output current in winding 48 as the train moves faster. This in turn causes the circuit 52 to regulate the generator current to progressively lower values as train speed increases. To overcome this disadvantage and make possible accurate current regulation, the series combination of capacitor C5, fixed resistor R30 and variable resistor R32 is connected in parallel with the transformer winding 50 to provide a rectifier 92 input circuit, comprising elements 50, C5, R30 and R32, whose impedance remains substantially constant as a function of frequency. As a result, the voltage input to rectifier 92 does not vary as train speed changes, but is directly proportional to the amplitude of the current through winding 50, so that the circuit 52 regulates the generator at a current value that is substantially uniform for all train speeds.

The regulating system circuits 42, 52, and 56 of FIGURE 2 may be constructed for example with the following component values, which are presented only for purposes of illustration since the invention is not limited to them.

| | |
|---|---|
| T1 | 2N1194. |
| T2 | 2N268. |
| T3 | 2N1545. |
| D1 | 6.8 volt Zener diode. |
| D4 | 27 volt Zener diode. |
| D6 | 5.6 volt Zener. |
| D8 | IN537. |
| D10 | 11.2 volt Zener diode. |
| D12 | IN537. |
| R1 | 50 ohms. |
| R2 | 1800 ohms. |
| R4 | 330 ohms. |
| R6 | 120 ohms. |
| R8 | 47 ohms. |
| R10 | 250 ohm rheostat. |
| R12 | 250 ohm rheostat. |
| R14 | 6800 ohms. |
| R16 | 300 ohms. |

| | |
|---|---|
| R18 | 10 ohm potentiometer. |
| R20 | 100 ohms. |
| R22 | 50 ohms. |
| R24 | 100 ohms. |
| R26 | 180 ohms. |
| R28 | 270 ohms. |
| R30 | 220 ohms. |
| R32 | 500 ohm rheostat. |
| C1 | 75 microfarads. |
| C2 | 1.5 microfarads. |
| C3 | 10 microfarads. |
| C4 | 1.5 microfarads. |
| C5 | 8 microfarads. |

Since Zener diodes are not manufactured with uniform Zener voltages, the values of the resistors R16, R20, R22 and R24 may be adjusted to accommodate different values of the Zener voltages of diode D10.

In summary, described herein is a novel brushless generator system and a novel regulating system. Magnetic coupling is used between all the stationary and the rotating generator system members, obviating the requirement for brushes or similar sliding contacts. The generator system develops an alternating voltage which is then rectified to produce the desired direct current power. This construction efficiently performs the same functions that formerly required a direct current generator, a polarity reversing device and a reverse current relay.

The regulating system of the invention utilizes a controllable resistance shunting the input to a generator exciter to maintain the generator voltage at a selected level and the generator current below a selected maximum level. The shunting resistance is provided by an electronic amplifier, operated as an intermittent gating switch, in response to signals applied at two control inputs.

A voltage reference comparing circuit applies a sequence of uniformly spaced pulses to a first control input and controls the length of each pulse according to the amplitude of the generator output voltage relative to a selected voltage. These pulses cause the amplifier to shunt the exciter for the pulse duration, with the result that the generator output voltage is decreased. Thus, shorter pulses act to increase the generator output voltage.

When the generator current exceeds a maximum value, a current reference comparing circuit delivers to the other control input a generally pulsating signal that causes the amplifier to recurrently shunt the exciter supply, in a manner similar to the voltage regulation, according to the amount the generator current exceeds the selected value.

A further feature of the invention is that the current reference circuit does not operate until current regulation is needed, and the voltage reference circuit and the switching amplifier are only switched ON for longer times when the generator voltage is excessive. Accordingly, the regulating circuits operate with high efficiency and develop minimum heat, making it possible to use compact circuits that do not require high heat dissipation and other heat protection.

This regulating system provides accurate and reliable regulation of the generator output voltage and current, thereby minimizing damage to the generator, the storage battery and the generator's electrical load, which might otherwise result from exceeding the operating limits of the equipment.

The system provides a further advantage by sensing the alternating generator voltage, rather than battery voltage, to regulate the generator and at the same time sensing the fluctuations in the rectified generator voltage that result from changes in the load current.

Furthermore, the regulating system is free of moving parts and hence requires minimum periodic maintenance.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described our invention, what we claim as new and desire to secure by Letters Patent is:

1. In a regulated electric generating system having a generator whose alternating output power varies with the electrical excitation delivered to a generator exciter, the combination of
 (A) sensing means for coupling with the generator output power to produce a sensed voltage proportional to one parameter of the electric power output from said generator, said sensing means comprising
  (1) a winding linking the generator output power, and
  (2) a series resistor-capacitor circuit in parallel with said winding,
   (a) the impedance of the combination of said winding and said resistor-capacitor circuit being substantially uniform over the frequency range of the alternating generator output voltage
    (i) whereby said sensed voltage is substantially independent of the frequency of the generator output voltage
 (B) reference means having an impedance characteristic that has a nonlinearity at a threshold voltage,
 (C) electronic means for applying a controllable impedance in parallel with the excitation delivered to the exciter,
  (1) said electronic means being connected with said sensing means and said reference means to receive a regulating signal proportional to the difference between said sensed voltage and said threshold voltage,
  (2) to control said impedance in response to said regulating signal to regulate the output power from the generator.

2. In a regulated electric generating system having a generator whose output voltage varies with electrical excitation current delivered to a generator exciter field winding, the combination of
 (A) sensing means for coupling with the generator output power
  (1) to develop a sensed voltage proportional to one parameter of the electrical power output from the generator,
 (B) an electrical bridge circuit receiving said sensed voltage between a first pair of bridge terminals,
  (1) a reference element connected in a first arm of said bridge circuit and
   (a) having an impedance characteristic with a nonlinearity at a threshold voltage,
  (2) said bridge circuit comparing a selected portion of said sensed voltage with said threshold voltage and
   (a) developing a regulating voltage when the selected portion of said sensed voltage exceeds said threshold voltage,
 (C) a shunt regulator including
  (1) an electronic valve having
   (a) a first terminal for direct electrical connection to one side of the exciter field winding,
   (b) a second terminal for direct electrical connection to the other side of said exciter field winding,
   (c) a control input terminal connected to receive said regulating voltage,
   (d) said valve operating in response to said regulating voltage to selectively provide a low impedance circuit path between said first and second terminals thereby shunting substantially all excitation current from the exciter field winding.

3. The combination defined in claim 2
   (A) in which said bridge circuit further comprises resistance means having a temperature coefficient of resistance,
       (1) said resistance means being connected in said bridge circuit to vary with temperature the portion of said sensed voltage that is compared with said threshold voltage.

4. The combination defined in claim 2 in which
   (A) said voltage sensing means develop a cyclical fluctuating sensed voltage whose amplitude is proportional to the generator output voltage,
   (B) said bridge circuit compares with said threshold voltage a selected portion of said fluctuating voltage whose peaks exceed said threshold voltage and whose minima do not exceed said threshold voltage
       (1) to develop a pulsating regulating voltage, and
   (C) said valve providing said low impedance circuit path between said first and second terminals for a period corresponding to the duration of each pulse of said pulsating regulating voltage.

5. In a generator regulating system comprising in combination
   (A) current responsive means for coupling with a generator
       (1) to produce a first sensed voltage proportional to the current from the generator
   (B) a current reference comparing circuit
       (1) including a first voltage-responsive switch element operating at a first threshold voltage
       (2) said current reference comparing circuit being connected with said current responsive means and
       (3) comparing said first sensed voltage with said first threshold voltage
           (a) to produce a current regulating signal proportional to the amplitude of said first sensed voltage in excess of said first threshold voltage,
   (C) voltage responsive means for coupling with the generator
       (1) to produce a second sensed voltage proportional to the voltage from the generator,
   (D) a voltage reference comparing circuit
       (1) including a second voltage-responsive switch element operating at a second threshold voltage
       (2) said voltage reference comparing circuit being connected with said voltage responsive means and
       (3) comparing said second sensed voltage with said second threshold voltage
           (a) to produce a voltage regulating signal proportional to the amplitude of said second sensed voltage relative to said second threshold voltage,
   (E) a shunt circuit
       (1) having a controllable output impedance for connection in parallel with the excitation delivered to the generator,
       (2) connected to receive said current regulating signal and said voltage regulating signal, and
       (3) controlling the value of said output impedance in response to said voltage regulating signal and said current regulating signal.

6. The combination defined in claim 5 further comprising an isolating element connected with one of said reference comparing circuits and isolating the one reference comparing circuit from said shunt circuit in the absence of the regulating signal from the one reference comparing circuit.

7. The combination defined in claim 5 in which said voltage reference comparing circuit further comprises an isolating element isolating said voltage circuit from said shunt circuit when said second threshold voltage exceeds said second sensed voltage.

8. The combination defined in claim 5 in which
   (A) said voltage reference comparing circuit develops a pulsating voltage regulating signal
       (1) with the durations of the pulses thereof corresponding to the amplitude of said second sensed voltage in excess of said second threshold voltage, and
   (B) said shunt circuit responds to said pulsating signal to switch a low output impedance in parallel with the excitation delivered to said generator for a time corresponding to the duration of each pulse.

9. A regulated electric generating system comprising in combination
   (A) an exciter,
   (B) a generator connected with said exciter and
       (1) developing an alternating output voltage that varies with the electrical excitation delivered to said exciter,
   (C) current responsive means coupled with said generator and
       (1) producing a direct current voltage proportional to the current from said generator,
   (D) a current reference comparing circuit
       (1) including a first switch operating at a first threshold voltage,
       (2) said current reference comparing circuit being connected with said current responsive means and
       (3) comparing a selected portion of said direct current voltage with said first threshold voltage
           (a) to produce a direct current regulating signal proportional to the amplitude of said selected portion of said direct current voltage in excess of said first threshold voltage
   (E) voltage responsive means coupled with said generator and
       (1) rectifying a portion of said generator output voltage to produce a rippling voltage proportional to the voltage from said generator,
   (F) a voltage reference comparing circuit
       (1) including a second switch operating at a second threshold voltage,
       (2) said voltage reference comparing means being connected with said voltage responsive means and
       (3) comparing a selected portion of said rippling voltage with said second threshold voltage,
           (a) to produce at second terminals a pulsating voltage regulating signal with the pulse duration being proportional to the amplitude of said selected portion of rippling voltage in excess of said second threshold voltage,
   (G) a normally OFF electronic switch
       (1) operable to assume an ON condition to apply a low resistance in parallel with the excitation delivered to said exciter,
       (2) connected with said first and second terminals,
       (3) responding to said pulsating voltage regulating signal to assume said ON condition for a time corresponding to the length of each pulse, and
       (4) responding to said direct current regulating signal to assume said ON condition for a time corresponding to the average amplitude of said direct current regulating signal.

10. The combination defined in claim 9 in which
    (A) said switch includes an electronic amplifier further comprising
        (1) a first electronic valve having third, fourth and fifth terminals, (a) said fourth and fifth terminals of said first valve being connected between the excitation delivered to said exciter,
(b) said first valev being connected in said amplifier with the voltage at said third terminal thereof controlling the first valve conduction between said fourth and fifth terminals,
(2) a first bias element connected with said first terminals to receive said direct current regulating signal,
(3) a second bias element connected with said second terminal to receive said pulsating voltage regulating signal,
(4) a second valve connected with said first and second bias elements and with said first valve to vary the voltage at said first valve third terminal in response to the signals applied to said first and second bias elements.

11. The combination defined in claim 9 in which
(A) said second switch is a Zener diode having a Zener voltage, and
(B) said voltage reference comparing circuit includes an electrical bridge circuit having a first pair of bridge terminals connected with said voltage responsive means to receive said rippling voltage,
(1) said Zener diode being connected in a first arm of said bridge circuit,
(2) said bridge circuit comparing a selected portion of said rippling voltage with said Zener voltage and,
(a) developing said pulsating voltage regulating signal between a second pair of bridge terminals when the selected portion of said rippling voltage exceeds said Zener voltage.

12. The combination defined in claim 11 in which said voltage reference comparing circuit further comprises a diode connected in series between one bridge terminal of said second pair thereof and said switch to substantially isolate said voltage circuit from said switch when said Zener voltage exceeds said selected portion of said rippling voltage.

13. The combination defined in claim 11 in which
(A) said first switch is a Zener diode having a Zener voltage, and
(B) said current reference comparing circuit includes a resistor connected with said current responsive means to develop said direct current voltage across said resistor,
(1) said resistor being further connected in series with said Zener diode between said first terminals.

References Cited by the Examiner
UNITED STATES PATENTS

| | | |
|---|---|---|
| 2,519,650 | 8/1950 | Hamilton _____ 322—25 X |
| 2,629,853 | 2/1953 | Harder et al. |
| 2,896,149 | 7/1959 | Lowry et al. |
| 3,034,035 | 5/1962 | Baumann et al. |

MILTON O. HIRSHFIELD, *Primary Examiner.*

LLOYD McCOLLUM, *Examiner.*

A. H. TISCHER, J. J. SWARTZ, *Assistant Examiners.*

UNITED STATES PATENT OFFICE
CERTIFICATE OF CORRECTION

Patent No. 3,290,582 December 6, 1966

Jentje J. Roosma et al.

It is hereby certified that error appears in the above numbered patent requiring correction and that the said Letters Patent should read as corrected below.

Column 2, line 57, strike out "to shunt the exciter input, the exciter is energized to" and insert instead -- the generator to develop an output voltage. Con- --; column 15, line 4, for "valev" read -- valve --; column 15, line 29, strike out "por-".

Signed and sealed this 19th day of September 1967.

(SEAL)
Attest:

ERNEST W. SWIDER
Attesting Officer

EDWARD J. BRENNER
Commissioner of Patents